Figure 2:
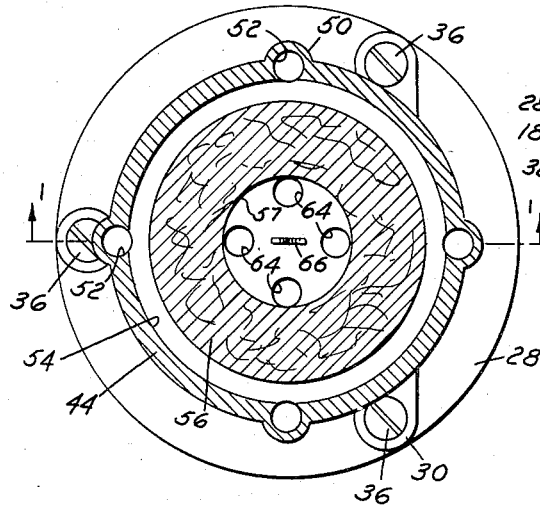

Feb. 7, 1956    F. J. DUPURE    2,733,775
FILLER PIPE CLOSURE APPARATUS
Filed Oct. 23, 1952    2 Sheets-Sheet 1

INVENTOR.
FORD J. DUPURE
BY
ATTORNEY

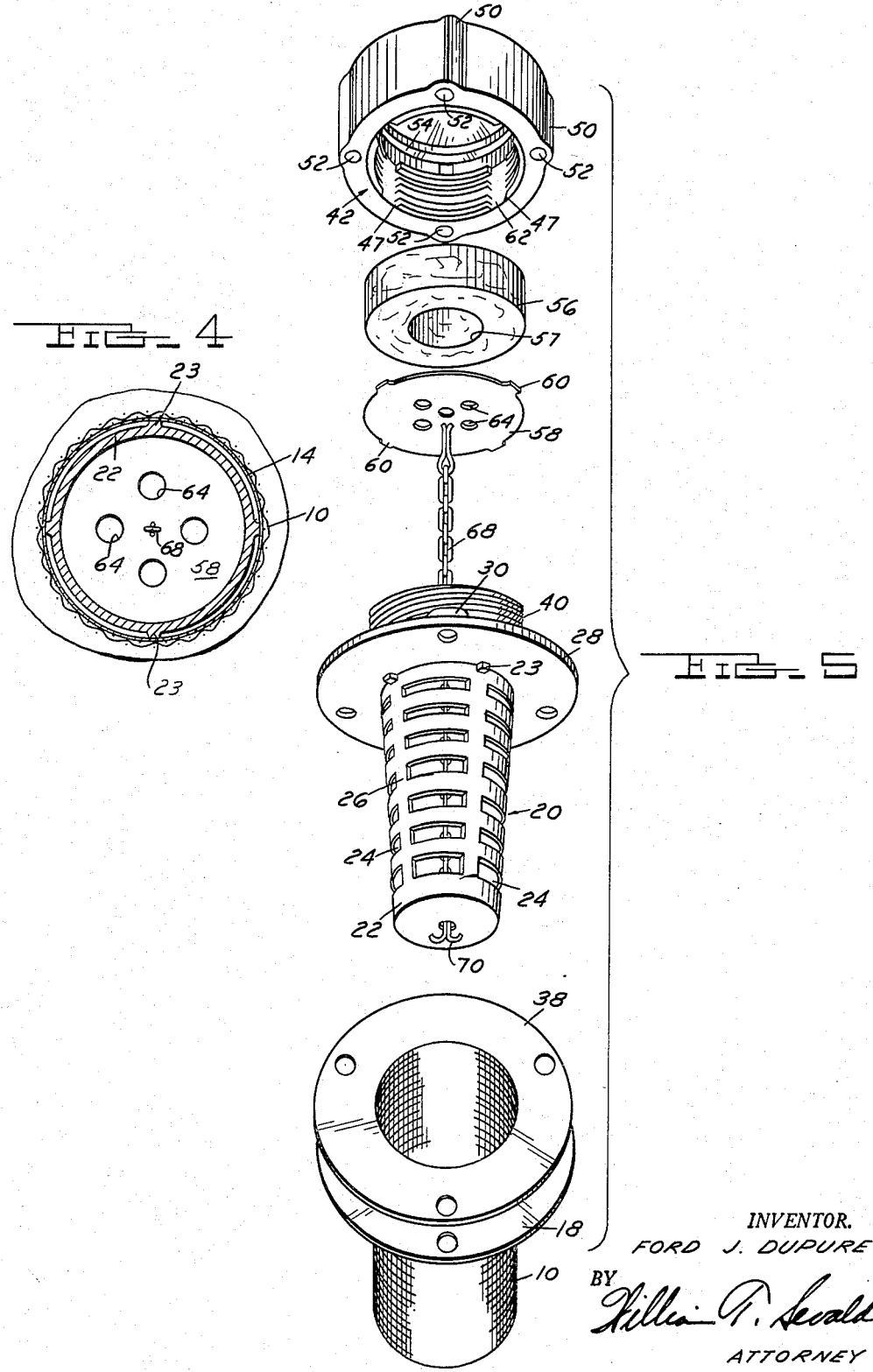

United States Patent Office 2,733,775
Patented Feb. 7, 1956

2,733,775
FILLER PIPE CLOSURE APPARATUS
Ford J. Dupure, Dearborn, Mich.

Application October 23, 1952, Serial No. 316,490

15 Claims. (Cl. 183—34)

This invention relates to apparatus for providing a closure in a filler pipe and more particularly to apparatus for providing for the admittance of filtered air through the pipe during the closure of the pipe so as to insure a safe storage of oil in a tank connected to the pipe. The invention also relates to apparatus for filtering any oil introduced into the pipe.

In order for oil to be introduced into tanks stored in the basements of many homes, a filler pipe is provided. The inner end of the pipe communicates with the oil tank and the outer end extends to a position outside of the house. A closure device is generally provided on the outer end of the pipe to prevent foreign matter from passing through the pipe to the oil tank.

One of the difficulties with the closure devices now in use is that they seal the pipe against admitting air into the oil tank and against allowing vapor in the tank from escaping into the amosphere. By sealing the pipe and oil tank to the atmosphere, the tank is prevented from "breathing" to provide for variations in atmospheric temperature. These variations in temperatures can often cover a range of 30° F. or 40° F. within a single period of 24 hours.

This invention provides apparatus for fitting on a pipe to close the pipe during the times that oil is not being introduced into the pipe. The apparatus includes a cap having a top portion and a downwardly turned lip portion, the bottom surface of which is so positioned relative to other parts of the apparatus as to provide a sheltered pocket exposed to the atmosphere. A plurality of ports extend through the lip portion from the bottom surface of the lip portion and communicate with the pipe to provide for "breathing" between the atmosphere and the oil in the tank. Because of the sheltered pocket formed by the lip portion on the cap, drops of rain and particles of dust cannot easily enter into the ports for passage into the pipe. A filter pad made from a suitably absorbent material is positioned within the lip portion of the cap adjacent the port to cleanse any air passing into the pipe.

The apparatus constituting this invention also includes components for filtering the oil introduced through the filler pipe into the oil tank. One of these components is a cylindrical filter screen suitably supported within the pipe and another component is an adapter. The adapter has an inverted frusto-conically shaped portion which fits in the filter screen and which is provided with laterally spaced slots. Because of its particular construction, the adapter operates to diffuse the stream of oil squirted into the pipe from a nozzle so as to prevent the oil from striking the filter screen with a considerable force. The adapter also prevents the nozzle or any other sharp object from striking the filter screen and punching a hole in it. In this way, the filter screen is maintained in good condition for a long period of time to remove any foreign material in the oil before the oil can pass into the tank.

An object of this invention is to provide apparatus for closing a filler pipe so that a gas tank connected to the pipe can "breathe" with variations in atmospheric condition.

Another object is to provide apparatus of the above character having a cap so channeled as to communicate with a filler pipe on which the cap fits, so that air can enter into an oil tank connected to the pipe and vapor can escape from the tank to maintain an optimum set of conditions in the tank.

A further object is to provide apparatus of the above character having a cap in which a filter pad made from an absorbent material is positioned adjacent the "breather" channels to insure that air free from moisture and foreign matter enters into the oil tank.

Still another object is to provide apparatus having a cap which forms a sheltered pocket with other components in the apparatus and which has a plurality of channels extending from the pocket and communicating with the pipe such that drops of rain and particles of dirt cannot enter into the channel.

A still further object is to provide apparatus of the above character for diffusing a stream of oil poured into the pipe and for filtering the oil after it has been diffused.

Figure 1:
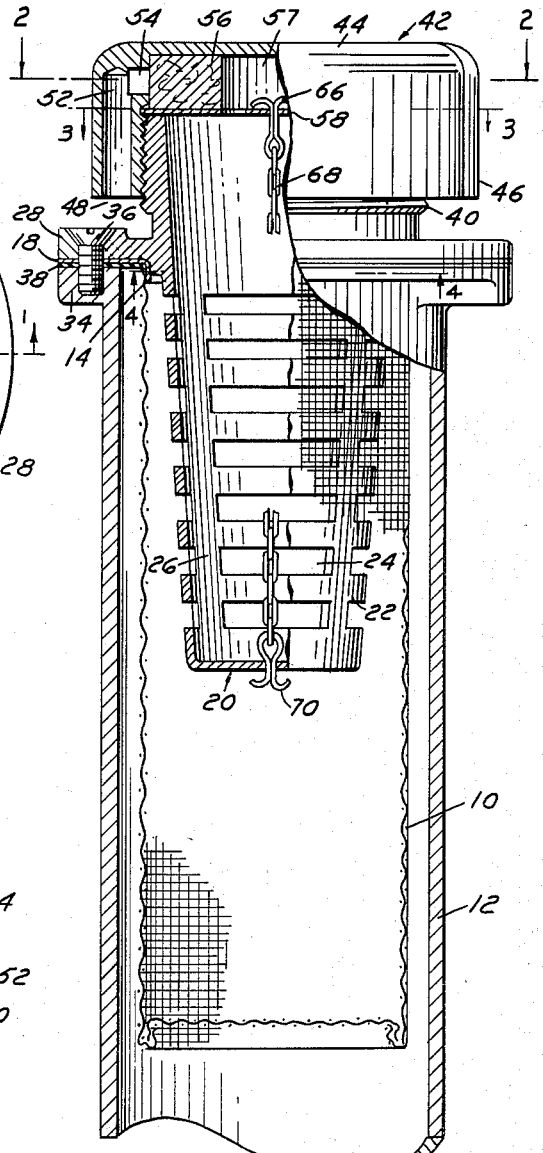

These and other objects and advantages of the invention will become apparent by reference to the following description of the closure apparatus embodying the invention taken in connection with the accompanying drawings, in which:

Fig. 1 is a sectional view substantially on the line 1—1 of Fig. 2 and shows the closure apparatus in assembled relationship, certain parts being broken away to show them in further detail.

Figure 3:
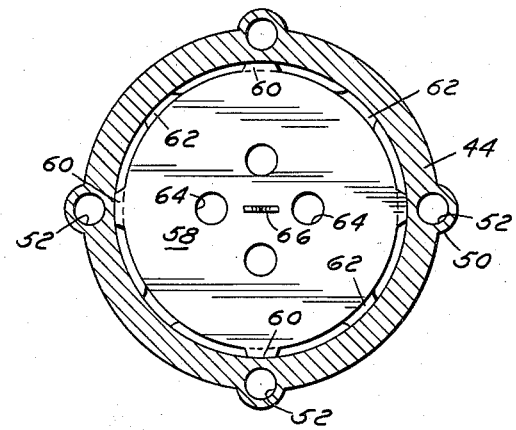

Figs. 2, 3, and 4 are sectional views substantially on the lines 2—2, 3—3, and 4—4 respectively of Fig. 1; and Fig. 5 is an exploded view illustrating the different components of the invention in their unassembled relationship, as seen from a position above the filter and below all of the other components.

In one embodiment of the invention, a cylindrical filter screen 10 is adapted to fit inside a filler pipe 12 which extends from an oil tank (not shown) in the basement of a house to a suitable position outside of the house. The filter screen 10 is made from a wire mesh and is open at the top. A downwardly turned annular lip portion 14 (Fig. 4) is suitably attached as by soldering or brazing to the inner surface of the filter screen 10 at the upper end of the screen. An annular flange 18 extends integrally from the lip portion 14 and has a plurality of holes provided in it at spaced intervals.

An adapter, generally indicated at 20, having an inverted frusto-conical bottom portion 22 is adapted to fit inside the filter screen 10. A plurality of laterally disposed lugs 23 (Figs. 4 and 5) are provided at the top of the frusto-conical portion 22 to insure that the portion 22 fits snugly in the filter 10. A plurality of lateral slots 24 are provided in the bottom portion 22 and are laterally separated from each other by a plurality of vertical ribs 26. The width of the slots progressively increases as the adapter portion 22 extends into the filter 10. A flange 28 extends outwardly from the adapter 20 at an intermediate position in the adapter. The flange 28 is provided with a plurality of bosses 30 (Fig. 2) which are spaced at intervals corresponding to the holes in the flange 18. Countersunk holes are provided in the bosses 30 so that the flanges 28 and 18 can be secured to a flange 34 (Fig. 1) in the pipe 12 by suitable screws 36. A gasket 38 is inserted between the flange 18 on the filter 10 and the flange 34 on the pipe 12 to seal the pipe against the leakage of oil.

The adapter 20 has a cylindrically shaped threaded portion 40 which extends integrally from the flange 28 to a position above the flange. A cap, generally indicated at 42, has a top portion 44 and a downwardly turned lip portion 46 which is inwardly threaded so as to be screwed on the upper portion 40 of the adapter 20. As may be seen in Fig. 5, the threads are provided in the lip portion 46 at spaced intervals along the periphery of the lip portion so as to be separated by axial sockets 47. The lip portion 46 forms a sheltered pocket 48 (Fig. 1) with the flange 28 on the adapter 20.

The lip portion 46 has a plurality of bosses 50 spaced around its periphery. Ports 52 extend upwardly from the pocket 48 partially through the lip portion 46 and partially through the bosses 50 to a position near the top portion 44 of the cap. The ports 52 communicate with an annular recess 54 provided in the inner surface of the lip portion 46 at a position near the top of the ports.

An annular filter pad 56 having a centrally disposed hole 57 is positioned adjacent the recess 54. The filter pad 56 is made from a suitable material, such as felted wool or a synthetic fibre, to absorb drops of water and to detain particles of dirt which pass through the ports 52 and the recess 54. An annular cover plate 58 having suitable lugs 60 (Figs. 3 and 5) is supported in a socket 62 in the lip portion 46 to maintain the filter pad 56 in fixed position adjacent the recess 54. The plate 58 is retained in the socket 62 by rotating the lugs 60 under the threaded portions of the lip portion 46 after the plate has been first positioned so that the lugs lie in the sockets 47.

The plate 58 is provided with a plurality of holes 64 which are radially spaced from the center of the plate by a distance less than the radius of the hole 57 in the filter pad 56. A cotter pin 66 is secured to the plate 58 at the center of the plate. The cotter pin 66 holds one end of a chain 68, the other end of which is supported by a cotter pin 70. The cotter pin 70 is in turn secured to the bottom of the adapter 20.

To assemble the apparatus disclosed above, the gasket 38 is first positioned on the pipe flange 34 so that the holes in the gasket are aligned with the holes in the flange. The filter screen 10 is then inserted in the pipe so that the flange 18 rests on the gasket 38 with its holes properly aligned. The adapter 20 is subsequently positioned so that the frusto-conical portion 22 rests within the filter screen 10 and the flange 28 sits on the flange 18. After the holes in the flange 28, the flange 18, and the gasket 38 have been properly aligned, the filter screen 10 and adapter 20 are fixedly positioned to the pipe 12 by threading the screws 36 into the flange 34.

The cap 42 and its component parts are then assembled. The filter pad 56 is first inserted into the lip portion 46 so that it lies adjacent the recess 54. The cover plate 58 is then inserted into the socket 62 so that the lugs 60 are positioned in the sockets 47, and the plate is rotated until the lugs 60 are positioned in back of the threaded portions provided in the lip portion 46 between the sockets 47. After the cover plate 58 has been attached to the cap 42, the cap is screwed on the threaded portion 40 of the adapter 20.

During the times that the cap 42 is not screwed on the threaded portion 40 of the adapter 20, it is supported by the chain 68 so as to hang on the side of the pipe. Since the chain 68 is supported by the cover plate 58 and since the cover plate is in turn secured to the cap 42, the cap can never be lost when it has been unscrewed from the adapter 20.

When the cap 42 has been unscrewed from the threaded portion 40, oil may be squirted into the pipe from a nozzle (not shown). The oil first passes into the adapter 20. Because of the inverted frusto-conical shape of the bottom portion 24, the stream of oil becomes diffused and the oil flows in an orderly manner through all of the slots 24. The progressive increases in the width of the slots 24 from the top to the bottom of the portion 22 also produce a diffusion of the oil stream. The oil then passes into the filter screen 10, which removes all foreign matter from the oil before the oil can flow through the pipe 12 into the oil tank (not shown). In addition to diffusing the oil, the adapter 20 also serves as a guard to prevent the nozzle and any other sharp object from being thrust into the pipe so as to strike the filter screen 10. In this way, the filter screen is protected from punctures and is maintained in good condition to provide an optimum cleaning action on the oil passing through the pipe 12. Since the filter screen 10 and the adapter 20 are removable, they can be removed at times so as to be cleaned of any foreign matter that may have collected in them.

During the times that the cap 42 is screwed on the threaded portion 40 of the adapter 20, a channel is provided between the atmosphere and the pipe 12. This channel includes the ports 52, the recess 54, the pores in the filter pad 56 and the holes 64 in the cover plate 58. Because of this channel, air is able to flow through the pipe into the oil tank. The air moves in an orderly manner through the pipe 12 because of the action of the annular recess 54 and the gasket 56 in spreading the air throughout the entire annular periphery of the lip portion 46. The air contains a minimum amount of foreign matter such as rain drops and dirt particles, since it must pass into the ports 52 in an upward direction from the pocket 48. Even if some moisture should pass through the ports 52 into the recess 54, it becomes absorbed by the filter pad 56. The filter pad 56 also detains any dirt particles that may move through the ports 52.

The cap 42 not only admits air into the gas tank during such times as the vapor pressure in the tank may be low, but it also permits the passage of oil vapor into the atmosphere when too much vapor has collected in the tank above the oil. In this way, the tank is able to "breathe" at all times so as to allow for variations in atmospheric temperature and pressure. By providing for such "breathing," the cap 42 causes oil to be maintained in the tank under optimum conditions of safety.

I claim:

1. Apparatus for providing a closure in a filler pipe, including, a filter screen adapted to fit within the pipe so as to receive all of the oil introduced into the pipe, an adapter positioned within the filter screen, said adapter constituting a combined screen protector and cap securing means, there being a plurality of perforations in the adapter to provide for the passage of oil through the adapter into the filter screen, means for securing the adapter and filter screen to the pipe, a cap removably secured to said adapter and having top and lip portions, there being at least one port extending through the lip and top portions of the cap to provide for the passage of air through the cap into the adapter, and a filter pad positioned within the cap adjacent the ports in the cap and made from a suitable material to insure the passage of clean air into the adapter.

2. Apparatus for providing a closure in a filler pipe, including, a filter screen adapted to fit within the pipe, a flange on the filter screen, a perforated adapter positioned within the filter screen, said adapter constituting a combined screen protector and cap securing means, a flange on the adapter, means for securing the flanges on the filter screen and the adapter to the pipe, a threaded portion extending from the adapter, a threaded cap removably screwed on the threaded portion of the adapter, means provided within the cap to communicate with the adapter for the introduction of air into the pipe, and a filter pad positioned within the cap to insure the passage of clean air through the pipe.

3. Apparatus for providing a closure in a filler pipe, including, a filter screen adapted to fit within the pipe, a flange on the filter screen, an adapter positioned within the filter screen, said adapter constituting a combined screen protector and cap securing means, the adapter being slotted at one end to communicate with the filter screen, a flange on the adapter extending from an intermediate position on the adapter, means extending through the flanges in the adapter and the filter screen to secure them to the pipe, a cap removably secured to the adapter on the end opposite from the slots, there being at least one port extending through the cap to provide a communication between the adapter and the atmosphere, and a filter pad positioned between the cap and the adapter to insure the passage of clean air through the pipe.

4. Apparatus for providing a closure in a filler pipe, including, a filter screen adapted to fit within the pipe and having an opening at the top, a flange extending outwardly from the top of the filter screen, an adapter positioned within the filter screen and having an opening at the top, said adapter constituting a combined screen protector and cap securing means, the adapter tapering inwardly as it extends downwardly into the filter screen, the adapter being slotted to communicate with the filter screen along the portion fitting within the filter, means for securing the adapter and the filter screen to the pipe, a cap removably secured on the adapter, at least one port being provided in the cap to provide a communication between the atmosphere and the adapter, and a filter pad positioned within the cap to cleanse the air passing through the ports.

5. Apparatus for providing a closure in a filler pipe, including, a filter screen adapted to be positioned within the pipe, a flange extending from the top of the filter screen, an adapter positioned within the filter screen, said adapter constituting a combined screen protector and cap securing means, there being perforations in the adapter to provide a communication with the filter screen, means extending through the flanges in the adapter and the filter screen and through the pipe to secure the adapter and the filter screen to the pipe, and a cap having a top portion and a downwardly turned lip portion, the cap removably fitting on the adapter to provide in conjunction with the flange on the adapter a sheltered pocket exposed to the atmosphere, there being at least one port extending from the pocket through the lip portion to provide a communication with the adapter.

6. Apparatus in accordance with claim 5, including, a filter pad positioned within the cap adjacent the ports to insure the passage of clean air into the pipe.

7. Apparatus in accordance with claim 5, including, a recess in the lip portion and communicating with the ports in the lip portion, a filter pad positioned within the lip portion adjacent the recess to insure the passage of clean air into the pipe, and a cover plate supported within the lip portion to maintain the filter pad in fixed position adjacent the recess.

8. Apparatus for providing a closure in a filler pipe, including, a filter screen adapted to fit within the pipe so as to receive all of the oil introduced into the pipe, a flange extending outwardly from the top of the filter screen, an adapter positioned within the filter screen, said adapter constituting a combined screen protector and cap securing means, the adapter tapering inwardly as it extends into the filter screen to provide for the orderly passage of oil into the filter, a flange extending from the adapter, means for securing the flanges to the pipe, a cap removably fitting on the adapter, the cap having a top portion and a downwardly turned lip portion forming with the flange on the adapter a sheltered pocket exposed to the atmosphere, there being at least one port extending from the pocket through the lip portions of the cap so as to provide a communication with the adapter, a filter pad positioned in the cap adjacent the ports and made from a material to cleanse the air passing through the ducts, and a plate removably secured to the cap to fixedly position the filter pad within the cap, there being a plurality of holes in the plate to provide a communication between the cap and the adapter.

9. Apparatus for providing a closure in a filler pipe, including, a filter screen fixedly positioned within the pipe, an adapter fixedly positioned within the filter screen, said adapter constituting a combined screen protector and cap securing means, there being slots in the adapter to provide a communication with the filter screen, a cap having a top portion and a downwardly turned lip portion removably secured to the adapter, at least one port extending through the lip portion to provide a communication between the atmosphere and the adapter, a recess provided in the interior surface of the lip portion adjacent the top portion of the cap and communicating with the ports, a filter pad made from a suitable absorbent material and adapted to be positioned in the lip portion of the cap adjacent the recess, and a plate fixedly positioned in the lip portion below the filter pad to maintain the filter pad adjacent the recess in the lip portion, there being a plurality of holes in the plate to provide a communication between the cap and the adapter.

10. Apparatus for providing a closure in a filler pipe, including, a filter screen positioned within the pipe to receive the oil poured into the pipe, a flange extending outwardly from the filter screen, an adapter having a portion positioned within the filter screen and a threaded portion extending above the filter screen, there being a plurality of lateral slots in the adapter at spaced intervals along the adapter, a flange extending outwardly from the adapter, means for securing the flanges on the adapter and the filter screen to the pipe, a cap having a top portion and a downwardly turned lip portion interiorly threaded to screw on the threaded portion of the adapter in spaced relationship to the adapter flange so as to form a sheltered pocket exposed to the atmosphere, there being a plurality of spaced ports extending upwardly from the pocket through the lip portion of the cap, a recess in the lip portion and communicating with the ports, a filter pad positioned in the recess and made from an absorbent material to block the passage of moisture and dirt to the pipe, and a cover plate supported within the lip portion to maintain the filter pad in fixed position adjacent the recess, there being a plurality of holes in the cover to provide a communication between the cap and the adapter.

11. Apparatus in accordance with claim 10 in which the interior threads in the lip portion are separated by sockets and in which the cover plate is provided with lugs for initial insertion in the sockets and for subsequent rotation with the plate so as to become positioned behind the threads.

12. Apparatus for providing a closure in a filler pipe, including, a screen-like cylinder positioned within the pipe to filter oil passing through the pipe, an annular flange extending outwardly from the cylinder, an annular adapter having an inverted frusto-conical portion positioned within the cylinder, there being a plurality of lateral slots in the frusto-conical portion to facilitate the flow of oil through the adapter, an annular flange extending outwardly from the cylinder, an annular flange extending outwardly from the adapter, means for securing the flanges on the cylinder and the adapter to the pipe, a threaded annular portion on the adapter extending upwardly from the flange, an annular cap having a top portion and a downwardly turned lip portion, the lip portion being inwardly threaded to screw on the threaded portion of the adapter so as to produce between the adapter and the cap a sheltered pocket exposed to the atmosphere, there being a plurality of ports extending upwardly through the lip portion from the pocket, an annular recess in the lip portion in communication with the ports, an annular filter pad made from an absorbent material and positioned adjacent the recess, there being an axial hole in the center of the filter pad, there being a socket in the lip portion of the cap below the recess, and an annular plate slidable in the slot to become secured to the cap, there being a plurality of holes in the plate to provide a communication with the adapter.

13. A filler pipe closure cap for preventing the passage of moisture and dirt into said pipe while permitting the passage of air, said cap comprising a top portion, an annular downwardly turned lip portion extending from said top portion, at least one port extending through said lip portion, said port terminating at one end in an opening facing in a direction opposite said top portion, said port terminating at its other end in a recess formed in the interior surface of said lip portion and opening in a direction parallel to said top portion, and securing means on said lip portion for removably securing said cap to said pipe.

14. A filler pipe closure cap as set forth in claim 13 including a filter pad disposed within said cap adjacent the inside of said top portion and adjacent said recess, and means for retaining said filter pad in position, said means comprising an apertured plate having projecting lugs cooperating with said securing means for maintaining said plate and said filter pad in position.

15. In a filler pipe having a filter screen therein for filtering fluid introduced thereto, closure apparatus for said pipe comprising an adapter constituting a combined screen protecting portion and cap securing portion, said adapter having means thereon for securing same to said pipe with said screen protecting portion being disposed within said screen so that all fluid introduced into said pipe must pass through said portion, and fluid passage means in said portion in communication with said screen for permitting the passage of fluid from said adapter to said screen; said screen protecting portion of said adapter tapering in a direction inwardly of said pipe, said fluid passage means comprising laterally spaced slots of progressively increasing width in the direction of taper to provide an orderly flow of fluid through said adapter.

References Cited in the file of this patent

UNITED STATES PATENTS

| | | |
|---|---|---|
| 1,621,026 | Pukerud | Mar. 15, 1927 |
| 1,677,118 | Ford | July 10, 1928 |
| 1,960,657 | Alexander | May 29, 1934 |
| 2,172,031 | Norman | Sept. 5, 1939 |
| 2,366,428 | Scott | Jan. 2, 1945 |
| 2,500,859 | Pates | Mar. 14, 1950 |
| 2,603,308 | McCall | July 15, 1952 |
| 2,689,551 | Heller et al. | Sept. 21, 1954 |

FOREIGN PATENTS

| | | |
|---|---|---|
| 435,361 | Italy | May 17, 1948 |